July 17, 1956
L. S. LEE ET AL
2,755,396
AUTOMATIC BRAKING MECHANISM
Filed Sept. 17, 1952
2 Sheets-Sheet 1
FIG. 1
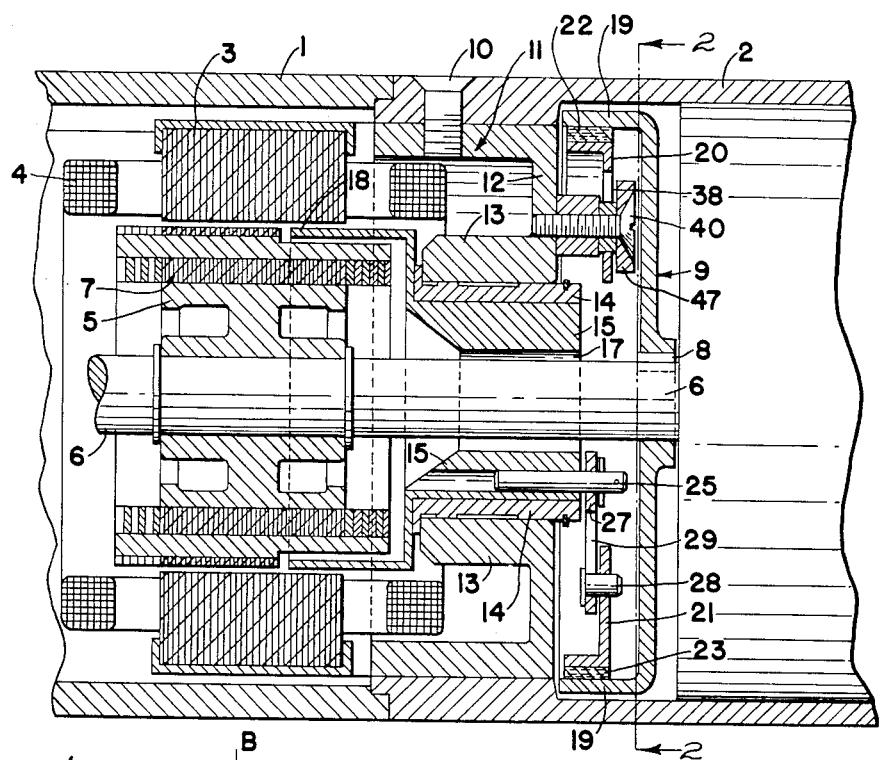
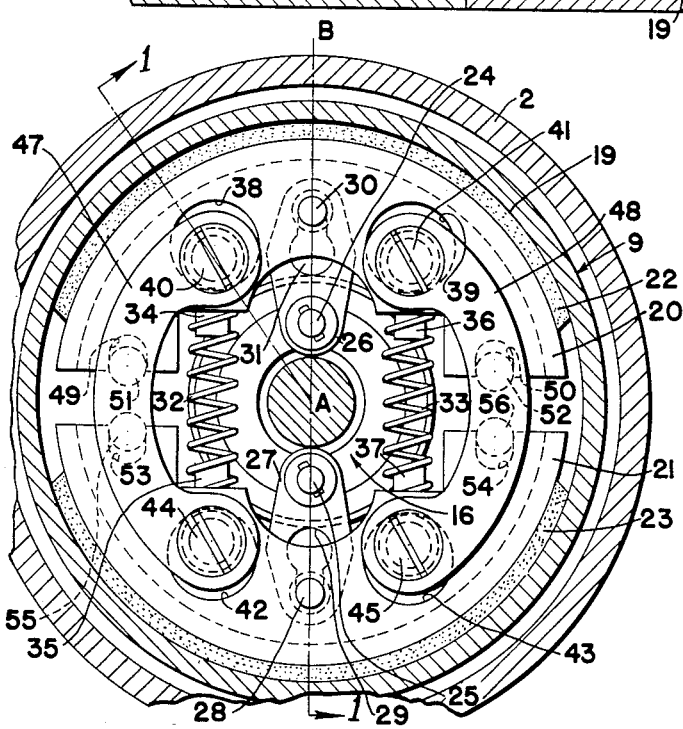
FIG. 2
INVENTORS
LYMAN S. LEE
RICHARD G. BEARDSLEY
BY *Frank H. Harmon*
ATTORNEY July 17, 1956  L. S. LEE ET AL  2,755,396
AUTOMATIC BRAKING MECHANISM
Filed Sept. 17, 1952  2 Sheets-Sheet 2

*INVENTORS*
*LYMAN S. LEE*
*RICHARD G. BEARDSLEY*
BY
*Frank H. L. Harmon*
ATTORNEY United States Patent Office 2,755,396
Patented July 17, 1956

2,755,396

AUTOMATIC BRAKING MECHANISM

Lyman S. Lee, Shaker Heights, and Richard G. Beardsley, Cuyahoga Falls, Ohio, assignors to Jack & Heintz, Inc., Cleveland, Ohio, a corporation of Delaware Application September 17, 1952, Serial No. 310,039

2 Claims. (Cl. 310—77)

This invention relates to electric motor braking mechanism and has for one of its primary objects to provide a simple, self-contained, practical and efficient electric motor brake that is normally resiliently applied, that is operated to be released by the force of magnetic flux when the motor is energized and that is resiliently and efficiently reapplied upon de-energization of the motor.

Another object is to provide an alternating current motor braking mechanism that requires the minimum expansive spring force for brake application and the minimum available torque for brake release.

Another object is to provide a braking mechanism that includes floating brake shoes, disposed within a minimum size housing, and which are free to operate in either direction of motor rotation.

A further and important object is to provide a braking mechanism to include new and novel linkage, whereby large mechanical advantages are gained in the flux power torque actuated brake releasing operation, and whereby, upon motor de-energization, the brake shoes, after initial spring impact with the brake drum, become self-energizing in their braking effect on the shaft of the motor after de-energization.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in longitudinal section, taken along line 1—1 of Figure 2 showing an electric motor comprising a stator and a rotor carried by a shaft, a brake drum keyed to the shaft, and a brake assembly including a drag cup, the brake being shown applied to the drum;

Figure 2 is a view in section taken along line 2—2 of Figure 1;

Figure 3:
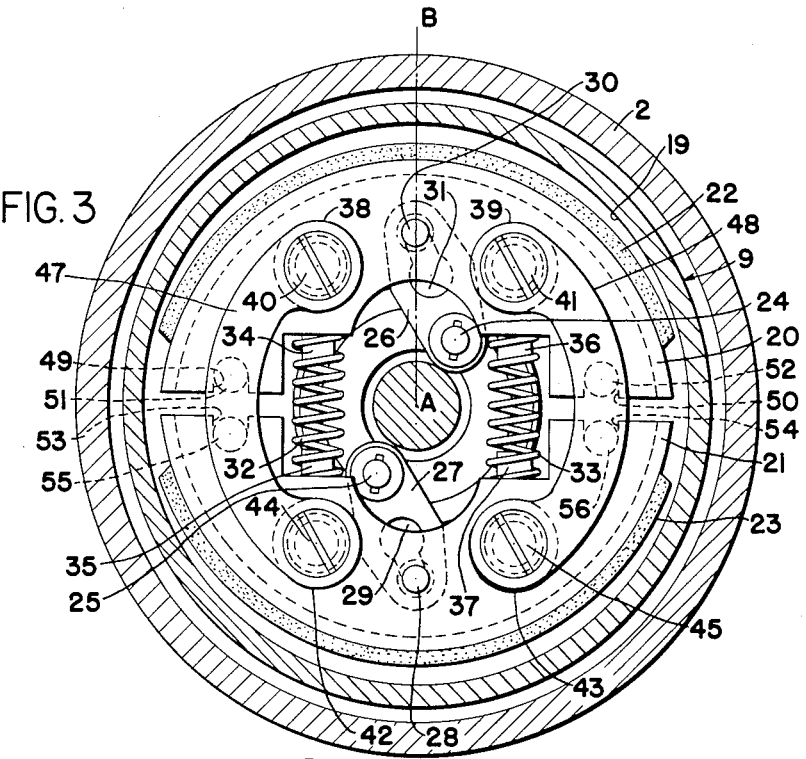
Figure 3 is a view similar to Figure 2, showing the brake shoes, and their brake linings, fully released from the brake drum.

The motor housing 1 has suitably secured thereto a motor shaft brake assembly housing 2. The electric motor includes the usual stator laminations 3 and interpoles 4 and a spider 5 rigid with the motor shaft 6 carrying the usual rotor 7 of an A. C. electric motor.

At a point removed from, and to the right of the motor and in housing 2, the motor shaft 6 has keyed thereto at 8, a brake drum, generally referred to at 9. Secured to the inner surface of housing 2 by means of bolts 10 is a stationary bushing generally referred to at 11. This bushing 11 is shown to integrally include a radial flange 12 and an axial flange 13 to serve as a bearing for bushing 14 integrally carried by the internal hub 15 of a magnetic drag cup, generally indicated at 16 in Figures 2, 3 and 4. This drag cup 16 has its hub free of attachment to the motor shaft 6 and provided with ample radial clearance, as indicated at 17. The drag cup also includes concentric extension 18 of greater diameter and lesser wall thickness extending, with radial clearance, between the rotor and stator. It is to be understood that this drag cup assembly is but one form of torque producing flux responsive mechanism that we may employ for our desired purposes.

The brake drum 9 is shown to be of the internal type with an axial circular flange 19 whose inner surface is adapted to be engaged by the brake assembly. The brake assembly is shown to include two generally arcuate brake shoes, generally indicated at 20 and 21, carrying brake linings 22 and 23 for engagement with the brake drum 19.

The drag cup hub 15 carries an upper pin 24 and a lower pin 25 for pivotally carrying links 26 and 27. The lower end of lower link 27 is pivotally connected to lower brake shoe 21 by a pin 28 that extends through link 27 and a button hole slot 29 in the brake shoe 21. Similarly, the upper link 26 is pivotally connected to upper brake shoe 20 by a pin 30 that extends through link 26 and a button hole slot 31 in the brake shoe 20.

Brake shoes 20 and 21 are normally resiliently urged radially outwardly by compression coil spring 32 and 33 extending radially between the two brake shoes and respectively about guide pins 34 and 35 and guide pins 36 and 37.

The upper brake shoe 20 is provided with enlarged slots 38 and 39 to loosely receive bolts 40 and 41 secured to stationary housing flange 12, and lower brake shoe 21 is provided with enlarged slots 42 and 43 to loosely receive bolts 44 and 45, also secured to flange 12. Bolts 41 and 45 receive the ends of a tie band 46, so as to serve as a guide means for the two adjacent ends of the two brake shoes 20 and 21 together at one side and bolts 40 and 44 receive the ends of a tie band 47, so as to serve as a guide means for the other two adjacent ends of the two brake shoes 20 and 21 at the other side.

The two ends of brake shoe 20 are provided with open slots 49 and 50 to loosely receive pins 51 and 52, respectively, on the outer face of bushing flange 12. The two ends of brake shoe 21 are similarly provided with open slots 53 and 54 to loosely receive pins 55 and 56, also on the outer face of bushing flange 12.

Figures 1 and 2 show the motor de-energized and the brake fully applied to the shaft 6 to maintain it at rest. Here, the two springs 32 and 33 are in expanded condition to force brake shoes 20 and 21 radially outwardly to force their brake linings 22 and 23 into resiliently forced frictional braking engagement with the internal surface of brake drum flange 19. Inasmuch as brake drum 9 is keyed at 8 to shaft 6, this brakes the shaft. In this position of full brake engagement, pins 30, 24, 25 and 28 and links 26 and 27 are in radial alignment with each other and the center of shaft 6, along line A—B. Pins 51, 52, 55 and 56 on the bushing flange 12 are unseated from the bottoms of open slots 49, 50 and 53 and 54 in the ends of the semi-circular brake shoes 20 and 21. Moreover, stationary bolts 40, 41, 44 and 45 are seated in the radially inward portions of the enlarged slots 38, 39, 42 and 43 in brake shoes 20 and 21.

Figure 4:
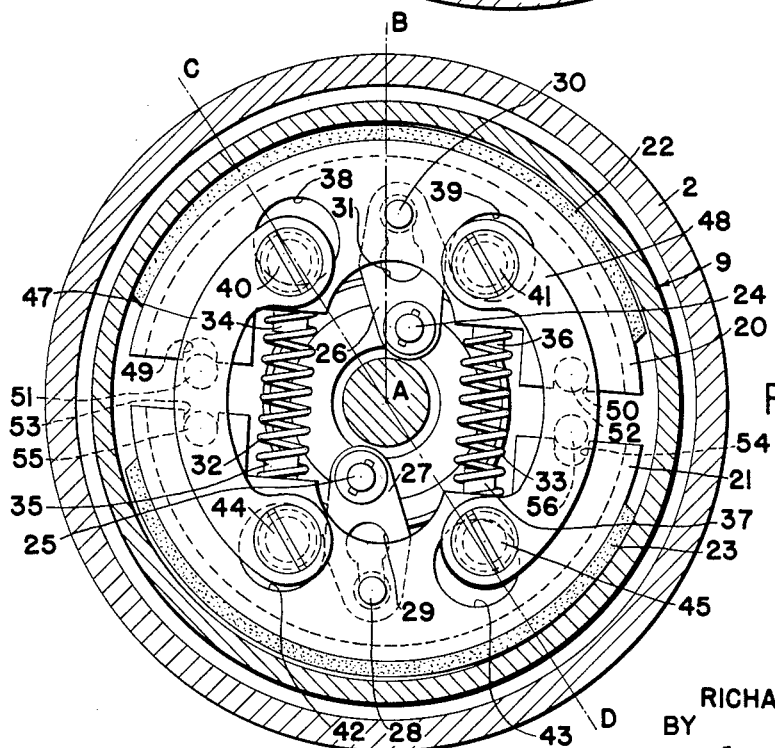
Figure 4 is a similar view, showing the brake shoes rotatively tilted upon initial frictional impact of the linings with the drum and at the initial stage of the operation of the self-energizing feature of the brake shoes.

When the motor is energized to rotate, for instance in a clockwise direction, as viewed in Figures 2, 3 and 4, the rotor 7 will be driven in a clockwise direction, accordingly. Inasmuch as the thin extension 18 of hub 15 of the drag cup 16 is in the same field as the rotor, a magnetic torque clutch drive is established to drive hub 15 clockwise. Drag cup hub 15 carries diametrically spaced pins 24 and 25. Thus, pins 24 are carried clockwise to assume their respective displaced positions of Figure 3, to angularly displace links 26 and 27 to pull radially inwardly on pins 30 and 28, carried by brake shoes 20 and 21, against the expansive action of springs 32 and 33. This moves brake linings 22 and 23 radially inwardly away from the brake drum. This leaves shaft 6 free to run for its useful intended purpose and, being keyed to the brake drum, the drum is also rotated, but free of the brake shoes and their brake linings.

The drag cup operates in the direction that the rotor turns. Therefore, the brake shoes will be pulled away from the brake drum, regardless of the direction in which the rotor turns. Referring again to Figure 3, pins 51, 52 and 55 and 56 have bottomed in the open slots 49, 50, 53 and 54 in brake shoes 20 and 21. Likewise, bolts 40, 41, 44 and 45, secured to stationary flange 12, have bottomed in the radially outward portion of enlarged slots 38, 39, 42 and 43 in brake shoes 20 and 21. Pins 30 and 28 are in radial alignment with each other and the shaft, along line A—B, but pins 24 and 25 have become offset clockwise. Links 26 and 27 have been rotated slightly counterclockwise about pins 30 and 28 as pivot points.

This construction provides for a large mechanical linkage efficiency in the brake releasing operation. This is obtained by reason of the location of pins 24 and 25 in such a manner as to be moved by the drag cup a considerable radial distance inwardly, in comparison to their rotational movement, from their positions of Figure 2 to those of Figure 3. This mechanical advantage gain is proportional to the difference in the distance of travel. The brake shoes 20 and 21 are mounted to be floating within the brake drum.

Upon de-energization of the motor, the drag cup also becomes de-energized and loses its rotational torque. The force that moved the linkage 26 and 27 from the positions of Figure 2 to those of Figure 3, and the consequent removal of application of the brake shoes, has accordingly been removed. This leaves the two expansive springs 32 and 33 again free to expand so as to force the brake shoes 20 and 21 outwardly to bring their brake linings 22 and 23 into frictional braking engagement with the brake drum.

However, when the brake linings 22 and 23 of the brake shoes 20 and 21 first engage the brake drum, the frictional engagement of this initial impact, under the action of springs 32 and 33, occurs while the brake drum, which it is desired to brake, is still rotating in a clockwise rotation. This initial impact friction also drags the two brake shoes 20 and 21 bodily clockwise to bring pin 52 to bottom in slot 50 of brake shoe 20 and pin 55 to bottom in slot 53 of brake shoe 21, as shown in Figure 4. Bolts 40, 41, 44 and 45 have shifted their positions in enlarge slots 38, 39, 42 and 43 from their relative positions of Figure 3. Pins 30 and 28 have shifted clockwise out of alignment with radial line A—B and pins 24 and 25, and the connecting links 26 and 27, have shifted relatively clockwise toward, but not reaching, alignment with radial line A—B, which line diametrically extended, bisects the brake linings and the brake shoes 20 and 21.

This initial impact friction, as shown in Figure 4, has shifted the brake shoes to be eccentric with respect to the center line A—B. The drag cup and the brake shoes are pivotally tied together by links 26 and 27. This angular shift of the brake shoes, the pins, and the two links 26 and 27, and the continued impact, brings about an increasing frictional braking engagement between the brake lining and the brake drum at a point on each brake lining approximately 30 degrees back of center with respect to the direction of rotation of the brake drum. Assuming this direction of rotation to be clockwise, such a point is shown at C, for brake lining 22 and point D for brake lining 23. The lines A—C and A—D are shown for comparison to center alignment line A—B. This off-center brake application on the follower side of center, with respect to direction of rotation, provides a brake that is self-energizing in operation. By a self-energizing brake, we mean to imply that, by reason of the construction described, the rotation of the brake drum and the brake shoes will force the brake linings angularly into the brake drum to thereby materially increase the force of the brake shoes against the brake drum. The braking force is tangent to the point of application. If this point were in alignment with, or in advance of, line A—B, this braking force would be materially less. By placing this point behind line A—B, the force is up hill to dig in.

This is accomplished by increased leverage length. For instance, and with respect to brake shoe 20, as it is frictionally rotated clockwise, stationary pin 52 acts as a limit stop to such rotation as it bottoms in the open slot 50 of the brake shoe, as shown in Figure 4. This rotational shift of brake shoe 20 from its normal position brings about a sudden and effective brake application at a point on the brake drum intersected by line A—C. Therefore, the brake application, instead of being solely responsive to radial exansion of springs 32 and 33, is leverage actuated, and the brake shoe 20 acts as its own lever extending from the point of brake application on the drum intersected by line A—C to pin 52 about which the brake shoe is pivoting clockwise. Exactly the same action simultaneously occurs with respect to brake shoe 21, the shifting of its slot 53 to be bottomed by pin 55 and the point of brake application being intersected by line A—D. These points of initial brake application have been shown as most preferable. The greater the leverage length is the greater the effectiveness will be, but not to a point where effective brake shoe lining surface area is sacrificed.

This is a highly important feature from another practical consideration. The environment motivating the present invention calls for a large braking power to be available within an envelope of minimum size. By reason of our self-energizing feature, the brake may be released by means of the minimum available torque. The only force to be overcome is the expansive force of springs 32 and 33. Springs 32 and 33 are preferably very light in load, inasmuch as their only required function is to press the brake shoes into initial frictional engagement with the brake drum, upon de-energization of the motor, in order to obtain the initial rotation to initiate this self-energization force.

It follows that when the brake shoes have brought the drum, and shaft, to rest, the expansive force of springs 32 and 33 is sufficient to rock the brake shoes and force them into the positions shown in Figure 2 in straight alignment with the two brake linings in full surface engagement with the brake drum.

We claim:

1. In combination with an electric motor having a rotor and a stator and a housing therefor, an internal bushing secured to said housing, a rotor shaft rotatably supported in said housing and rigid with said rotor, a brake drum rigidly carried by said shaft, opposed radially movable brake shoes carried by said housing to normally brake said shaft when said motor is de-energized, a magnetic drag cup member rotatably mounted in said bushing with annular clearance about said shaft and having a portion thereof disposed between the rotor and stator of said motor so as to be torsionally responsive to the force of magnetic flux created between said drag cup member and said motor when said motor is energized so as to be released from braking action for rotation, springs connected to said brake shoe for normally forcing said opposed brake shoes radially outwardly into braking engagement with said brake drum when said motor is de-energized, a pair of links connecting said drag cup and brake shoes pivotally with respect to the plane of relative rotation, limit stop means carried by said housing normally out of operative engagement with said brake shoes and in their path of rotation, said drag cup, upon energization by energization of said motor, through its pivotal link connection to said brake shoes, being adapted to rock said links rotatively about their connections to said brake shoes as pivots, to pull said brake shoes radially inwardly away from said drum, said brake shoes, upon de-energization of said drag cup being initially expanded by said springs to provide an initial frictional impact of said brake shoes with said drum to rock said brake shoes against said limit stop means to rock said brake shoes rotatively as brake levers to provide a self-energizing force for said brake shoes with respect to the direction of rotation of said shaft and said brake drum.

2. In combination with an electric motor having a rotor and a stator and a housing therefor, an internal bushing secured to said housing, a rotor shaft rotatably supported in said housing and rigid with said rotor, a brake drum rigidly carried by said shaft, opposed radially movable brake shoes carried by said housing to normally brake said shaft, when said motor is de-energized, a magnetic drag cup member rotatably mounted in said bushing with annular clearance about said shaft and having a portion thereof disposed between the rotor and stator of said motor so as to be torsionally responsive to the force of magnetic flux created between said drag cup member and said motor when said motor is energized so as to be released from braking action for rotation, springs connected to said brake shoe for normally forcing said opposed brake shoes radially outwardly into braking engagement with said brake drum when said motor is de-energized, a pair of links connecting said drag cup and brake shoes pivotally with respect to the plane of relative rotation, limit stop means carried by said housing normally out of operative engagement with said brake shoes and in their path of rotation, said drag cup, upon energization by energization of said motor, through its pivotal link connection to said brake shoes, being adapted to rock said links rotatively about their connections to said brake shoes as pivots, to pull said brake shoes radially inwardly away from said drum, said brake shoes, upon de-energization of said drag cup, being initially expanded by said springs to provide an initial frictional impact of said brake shoes with said drum to rock said brake shoes against said limit stop means to rock said brake shoes rotatively as brake levers to provide a self-energizing force for said brake shoes back of center of said brake shoes with respect to the direction of rotation of said shaft and said brake drum.

References Cited in the file of this patent
UNITED STATES PATENTS

| | | |
|---|---|---|
| 2,396,950 | Hemphill | Mar. 19, 1946 |
| 2,620,901 | Stearns | Dec. 9, 1952 |